United States Patent [19]

Eaton et al.

[11] 4,287,475

[45] Sep. 1, 1981

[54] CIRCUIT FOR THE ADAPTIVE SUPPRESSION OF NARROW BAND INTERFERENCE

[75] Inventors: William G. Eaton; Allan W. Roeder, both of Whitesboro, N.Y.

[73] Assignee: The United States of America as represented by the Secretary of the Air Force, Washington, D.C.

[21] Appl. No.: 82,355

[22] Filed: Oct. 5, 1979

[51] Int. Cl.³ .............................................. H04B 1/10
[52] U.S. Cl. ................................... 328/167; 364/825; 455/306
[58] Field of Search ........................ 333/165; 328/167; 364/572, 724, 825, 827; 375/1; 455/306, 307

[56] References Cited

U.S. PATENT DOCUMENTS

| 2,889,108 | 6/1975 | Cantrell | 328/167 |
| 3,942,035 | 3/1976 | Buss | |
| 4,049,958 | 9/1977 | Hartmann | 364/825 |
| 4,053,750 | 10/1977 | Constant | 364/724 |

*Primary Examiner*—Paul L. Gensler
*Attorney, Agent, or Firm*—Donald J. Singer; Willard R. Matthews, Jr.

[57] ABSTRACT

Adaptive suppression of narrow band interference is realized by a filter that automatically makes estimates of interfering signals in the frequency domain and separates the interference from the desired signal. Received analog signals are Fourier transformed in accordance with a CHIRP Z algorithm, squared, and filtered by an N point serial structural CCD to provide a smoothed power spectral density signal. The smoothed power spectral density signal is utilized to cancel interfering signals by any one of three mechanizations. One mechanization comprehends a threshold circuit that generates binary signals in response to the CCD output. The binary signals control a gate that gates strong frequency components (the estimates of the interfering frequency coefficient) from the Fourier transformer through to an inverse Fourier transformer. The inverse Fourier transformed strong frequency components are then subtracted from the delayed received analog signal. A second mechanization transmits the full Fourier transformed spectrum to the inverse Fourier transformer and utilizes the gate to notch out the strong frequency components in response to the CCD output. The third mechanization weights the Fourier transformed frequency coefficients with the smoothed power spectral density signal, inverse transforms the weighted spectrum and subtracts it from the delayed analog signal.

6 Claims, 6 Drawing Figures

CIRCUIT FOR THE ADAPTIVE SUPPRESSION OF NARROW BAND INTERFERENCE

BACKGROUND OF THE INVENTION

This invention relates to the suppression of interfering signals either intentional or non-intentional and in particular to the adaptive suppression of narrow band interference using charge coupled devices. It is applicable to spread spectrum communications, radar, navigation and identification equipment.

The filtering of interference in prior art systems has been accomplished by: (1) fixed filters where the signal interference is known a priori; and, (2) adaptive filters where a single reference signal which is similar to the expected interference is known a priori. Neither technique is effective when the requirement is to suppress unknown or changing interfering signals. Systems which can economically perform a real time spectral analysis of the input signal, identify the interfering signal or signals and remove the interfering signals have not previously been practical. There currently exists, therefore, the need for a simple, practical, inexpensive circuit that is capable of adaptively suppressing interference that is not known a priori. The present invention is directed toward satisfying that need.

SUMMARY OF THE INVENTION

The invention comprehends an adaptive filter for suppressing narrow band interference. In accordance with the principles of the invention, a complex sampled analog signal input is applied to a Fourier transformer which performs an N-point Discrete Fourier Transform via a CHIRP. The CHIRP Z transform is equivalent to a band of narrow band filters which are the basis for estimating frequency coefficients. Power spectral density is derived from the CHIRP and recovered by a sample and hold circuit after amplification. It is then thresheld by a DC comparator. The binary output of the comparator is used to gate the strong frequency coefficients of the CHIRP Z to a 32 point inverse CHIRP Z transformer thus providing an interference estimate in time. The estimated interference is subtracted from the input signal after it is delayed by a CCD delay. Resultant signals are applied to an adaptive matched filter for detection. In a second embodiment of the invention the full CHIRP Z transform spectrum is gated through to the inverse CHIRP Z transformer with the strong frequency coefficients notched out. No delayed input signal is required in this embodiment. The invention can also be implemented by weighting the CHIRP Z transformed spectrum with the ccd filter output, inverse transforming it and subtracting the result from the delayed input signal.

It is a principal object of the invention to provide a new and improved circuit for the adaptive suppression of narrow band interference.

It is another object of the invention to provide a means for achieving adaptive suppression of narrow band interference that does not depend upon a priori knowledge of the signal or interference.

It is another object of the invention to provide an interference suppression system that can economically perform a real time spectral analysis of the input signal, identifying the interfering signal or signals and remove the interference signals.

These together with other objects, features and advantages of the invention will become more readily apparent from the following detailed description taken in conjunction with the accompanying drawings wherein like items are given like reference numerals throughout.

DETAILED DESCRIPTION OF THE PREFERRED EMBODIMENT

The technique of the invention is to use a weighted Fourier transform as the basis function for estimating interfering frequency coefficients. The interfering frequency coefficients are squared, smoothed and detected. The detected interfering frequency coefficients can be: (1) inverse transformed into the time domain and subtracted from the delayed signal; (2) notched out from the total frequency spectrum. The notched spectrum is then inverse transformed into the time domain then routed to a matched filter; or (3) used to weight the transformed frequency coefficients. The weighted spectrum is then inverse transformed and subtracted from the delayed input signal in time. Specially designed charge coupled devices are used for performing discrete Fourier Transforms and Inverse Fourier Transforms via a CHIRP Z algorithm. Also, filtering of the CHIRP Z filter output is via a specially designed CCD which has a variable time constant for matching the interference estimate with its dynamics.

Figure 1:
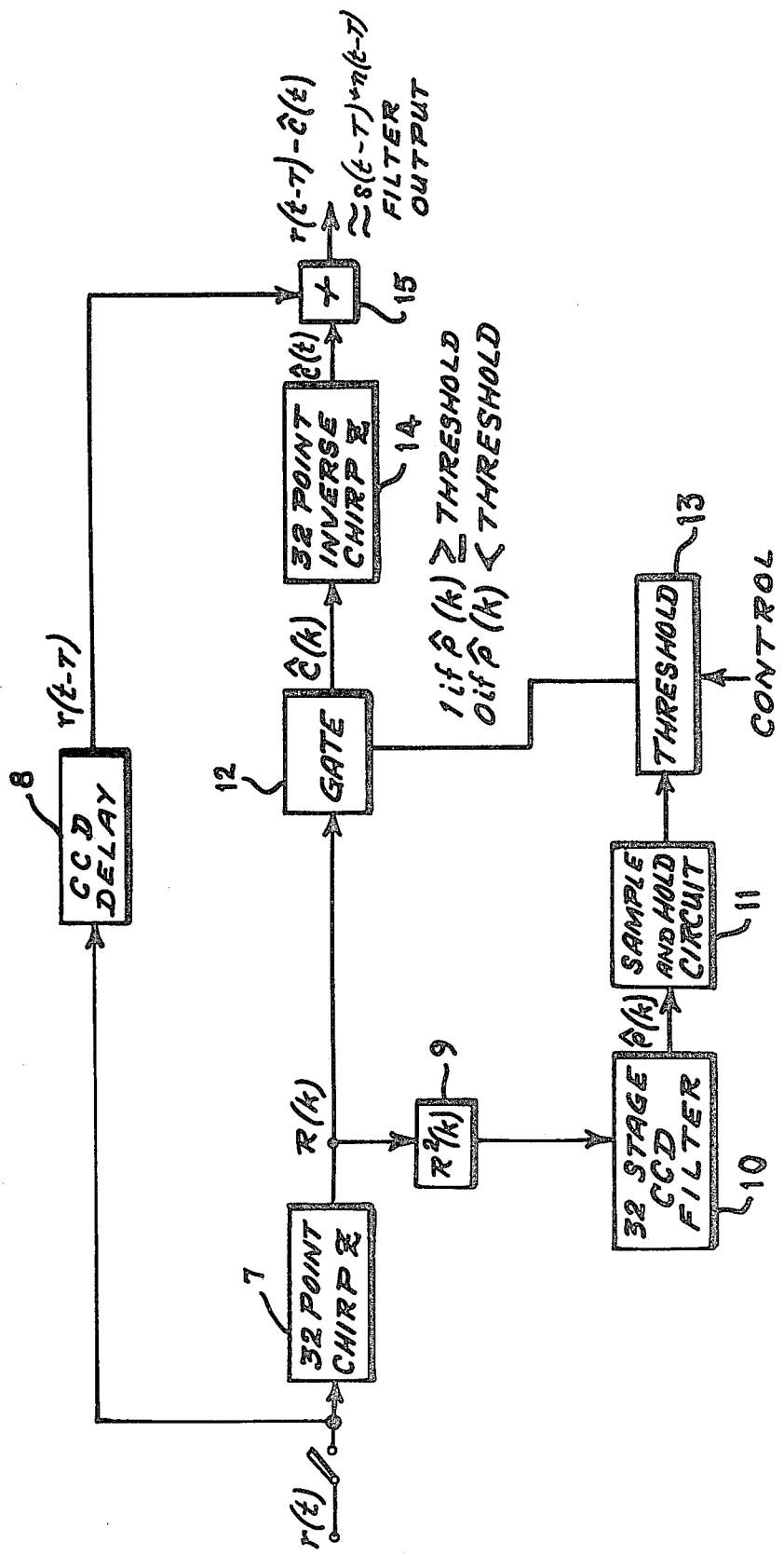
FIG. 1 is a block diagram of one presently preferred embodiment of the invention.

The adaptive filter of the invention utilizes a Fourier transformer that receives the desired signal and performs an N point CHIRP Z transform which is then squared and filtered by an N point serial structural CCD filter. The output of the CCD filter is a smoothed power spectral density signal that is used by an interference signalling circuit to cancel interfering signals from the desired signal. There are three architectural arrangements for this filter. The first is shown by FIG. 1 and comprises Fourier transform 7, CCD delay 8, squaring means 9, CCD filter 10, sample and hold circuit 11, gate 12, D.C. comparator 13, inverse Fourier transformer 14 and summing means 15, The signal input, r (t), is a complex sampled analog signal that has been synchronously demodulated into baseband inphase and quadrature components. The signal is composed of and may be written before sampling as:

$$r(t) = s(t) + c(t) + n(t)$$

where s(t) is a spread spectrum desired signal which has been Bi-phase or quadriphase modulated with data.

c(t) is narrow band interference(s), and n(t) is a white noise component

Figure 2:
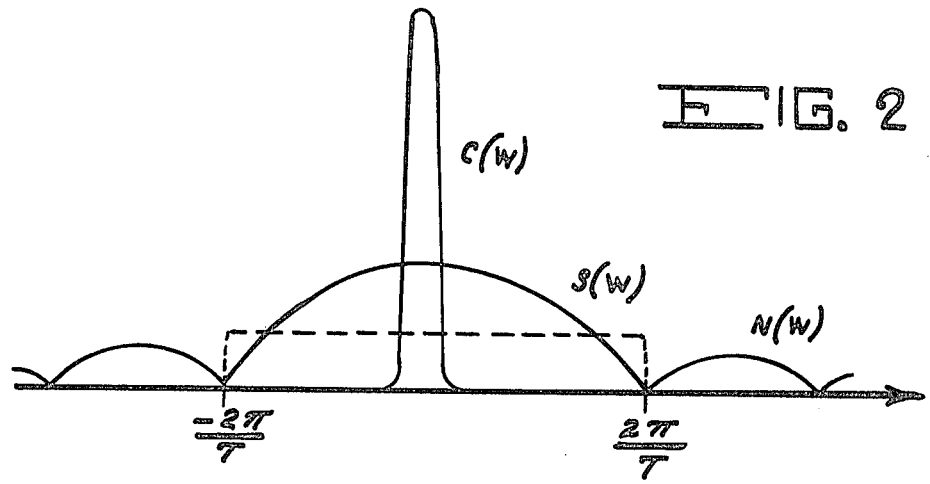
FIG. 2 illustrates the spectrum of an input signal decomposed into its constituent frequency components.

FIG. 2 depicts the spectrum of r(t) decomposed for illustration into its constituent frequency components wherein: S(W) is the desired signal S(t); C(W) is the narrow band interference c(t); and, N(W) is white noise n(t).

The objective is to estimate the narrow band interference C(W) and separate it from the desired signal S(W) and noise N(W). This is accomplished by doing an N-point Discrete Fourier Transform (DFT) according to:

$$R(k) = \sum_{n=0}^{N-1} r(n) e^{-j\frac{W}{2} nk}$$

$r(n) = n$th input time sample $$W = \frac{2\pi}{N}$$

$n$ = time sample index = 0, 1, 2, ....$N - 1$ $k$ = Frequency output sample index

= 0, 1, 2, ------, $N - 1$ $$j = \sqrt{-1}$$

$N$ = Number of time and frequency samples

The DFT is performed by the CHIRP Z according to:

$$R(k) = e^{-j\frac{W}{2} k2} \sum_{n=0}^{N-1} \left[ (r(n)) e^{-j\frac{W}{2} n2} \right] \left[ e^{j\frac{W}{2} (n-k)2} \right]$$

Figure 3:
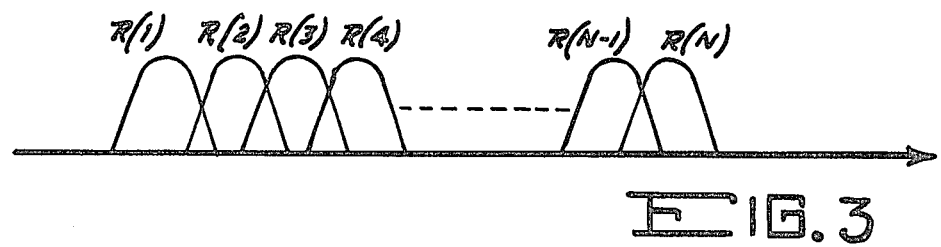
FIG. 3 are waveforms illustrating the filter effect of the CHIRP Z transformer.

Also, additional weighting of the input samples is performed (by conventional circuitry not shown) to reduce filter sidelobe levels down to an acceptable value of approximately 40 dB from peak. Hamming weighting is an acceptable candidate for this window weighting. The CHIRP Z is equivalent to a band of narrow band filters as depicted by R(1)- R(N) in FIG. 3. The filters are the basis for estimating frequency coefficients. Power spectral estimates are obtained by smoothing the power spectral density for gating or notching out the direct interfering frequency coefficients. Power spectral density is obtained by:

$$P(k) = R_1^2(k) + R_Q^2(k)$$

where
$R_1(k)$ = inphase output of $k^{th}$ filter
$R_Q(k)$ = quadrature output of $k^{th}$ filter
$k = 1, 2, - - - 32$ The power spectral density ($P_k$) is recursively filtered by a specifically designed 32 stage charge coupled device according to:

$$\hat{P}_{j+1}(k) = \hat{P}_j(k) + K[\hat{P}_j(k) - P_j(k)]$$

$\hat{P}_{j+1}(k)$ = output smoothed coefficients for the $k^{th}$ filter
$\hat{P}_j(k)$ = previous corresponding smoothed frequency coerfficient
$P_j(k)$ = Input frequency coefficient delayed by 32 clock pulses
$j$ = Sample delay index which corresponds to 32 clock pulses K = Constant inversely proportional to the time constant of the filter.

Figure 4:
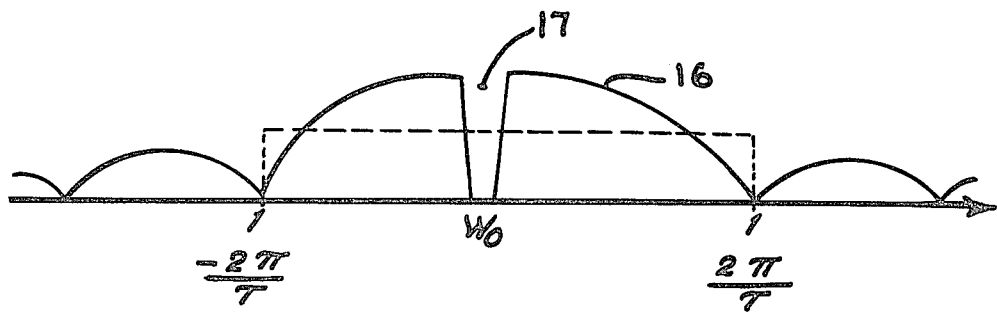
FIG. 4 illustrates the frequency spectrum with the interference component notched out.

The constant K is provided by selecting the size of the CCD storage area for each storage site. K is selectable in binary steps of 1, ½, ¼, - - - 1/64. The output of the recursive filters ($\hat{P}(k)$), the smoothed power spectral density, is recovered by Sample and Hold circuit 11 after amplification. Now the sampled power spectral density is thresholded via DC comparator 13 having an adjustable threshold. If the threshold is exceeded, the output is set to a binary "1" and if the threshold is not exceeded, the output is a binary "0". A binary "1" gates the strong frequency coefficients directly out of the CHIRP Z transformer 7. These strong frequency coefficients, C(k) are inverse transformed via 32 point CHIRP Z transformer 14 to give the interference estimate in time. Then the estimated interference in time, $\hat{C}(t)$, is subtracted from the delayed direct signal according to $r(t-T) - \hat{C}(t) \approx s(t) + n(t)$. Then, the residue is sent to an adaptive notched filter for data detection. The matched out spectrum is shown by curve 16 in FIG. 4.

Figure 5:
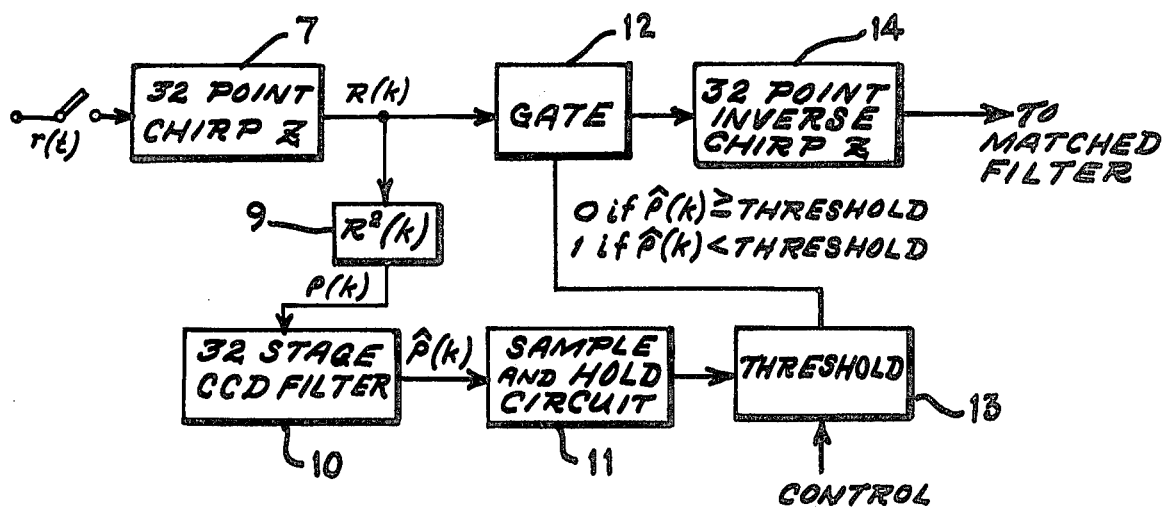
FIG. 5 is a block diagram of a second embodiment of the invention.

A second embodiment of the invention is illustrated by the block diagram of FIG. 5 and comprises Fourier transformer 7 squaring means 9, ccd filter 10, sample and hold circuit 11, D.C. Comparator 13, gate 12 and inverse Fourier transform 14. In this arrangement, the interference is detected as before except in this configuration, the strong frequency coefficients are notched out by the gate 12, as shown by notch 17 FIG. 4. All other frequency coefficients, R (k) are gated through to be inverse transformed into signal $\hat{r}(t)$, and routed to the matched filter after conversion into time by inverse Fourier transformer 14. In this configuration, the direct delayed sighal is not required.

Figure 6:
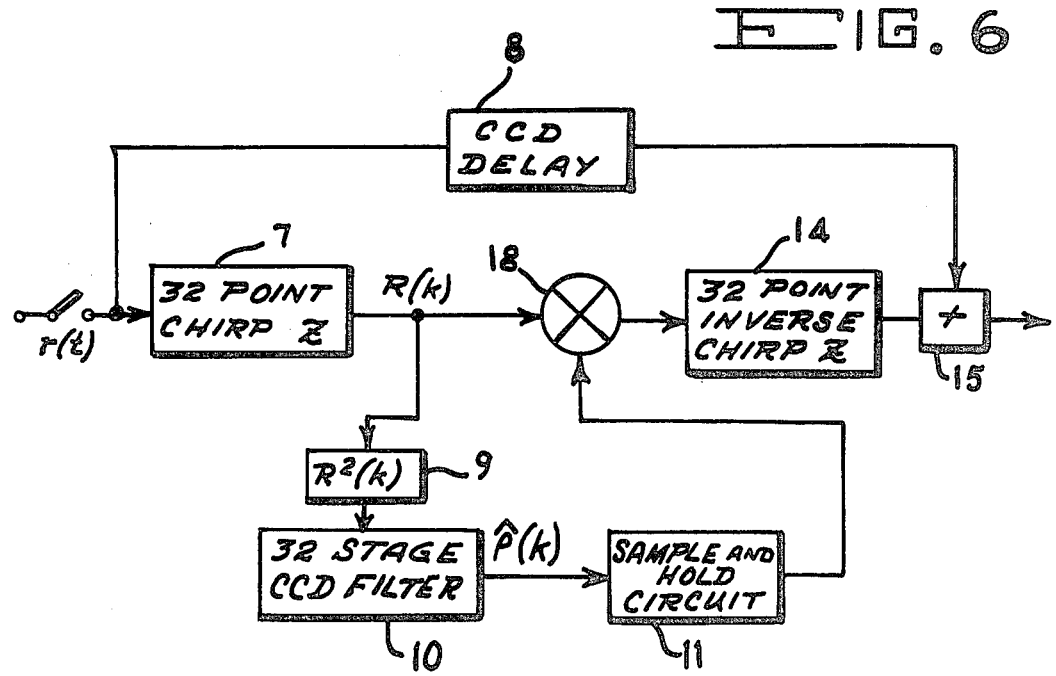
FIG. 6 is a block diagram of a third embodiment of the invention.

A more exact interference signal estimate could be obtained by using the smoothed power spectral density to weight the direct frequency coefficients from the CHIRP Z filter rather than threshold and gate them through as in the first arrangement described above. The weighted frequency coefficients would be inverse transformed and subtracted from the delayed direct signal. This is the third configuration and is illustrated by FIG. 6. The circuit of this implementation comprises Fourier Transformer 7, CCD delay 8, squaring means 9 CCD filter 10, sample and hold circuit 11, weighting means 18, inverse Fourier transformer 14 and summing means 15.

While the invention has been described in presently preferred embodiments, it is understood that the words which have been used are words of description rather than words of limitation and that changes within the purview of the appended claims may be made without departing from the scope and spirit of the invention in its broader aspects.

What is claimed is:

1. A circuit for the adaptive suppression of narrow band interference comprising
   means receiving analog signals,
   Fourier transform means performing an N point weighted Fourier transform on said received analog signals,
   squaring means for squaring the output of said Fourier transform means,
   recursive filter means for filtering the output of said squaring means to provide a smoothed power spectral density signal, and an interference signal cancelling circuit receiving said smoothed power spectral density signal and cancelling interference signals from said received analog input signals in response thereto.

2. A circuit for the adaptive suppression of narrow band interference as defined in claim 1 wherein said Fourier transform means comprises an N point charge coupled device adapted to perform discrete Fourier transforms by means of a CHIRP Z algorithim.

3. A circuit for the adaptive suppression of narrow band interference as defined in claim 2 wherein said recursive filter comprises an N point serial structured charge coupled device.

4. A circuit for the adaptive suppression of narrow band interference as defined in claim 3 wherein said interference signal cancelling circuit comprises
- delay means for providing delayed analog input signals,
- an inverse Fourier transform means performing N point discrete inverse Fourier transforms by means of a CHIRP Z algorithm,
- a threshold circuit generating binary signals in response to said smoothed power spectral density signals,
- gate means gating strong frquency components from said Fourier transform means to said inverse Fourier transform means in response to said binary signals, and
- means for subtracting the output of said inverse Fourier transform means from the output of said delay means.

5. A circuit for the adaptive suppression of narrow band interference as defined in claim 3 wherein said interference signal cancelling circuit comprising
- an inverse Fourier transforms means performing N point discrete inverse Fourier transforms by means of a CHIRP Z algorithm,
- a threshold circuit generating binary signals in response to said smoothed power spectral density signals, and
- gate means gating the output of said Fourier transform means to said inverse Fourier transform means and notching out strong frequency coefficients therefrom in response to said binary signals.

6. A circuit for the adaptive suppression of narrow band interference as defined in claim 3 wherein said interference signal cancelling circuit comprises,
- delay means for providing delayed anaolg input signals,
- an inverse Fourier transform means performing N point discrete inverse Fourier transforms by means of a CHIRP Z algorithm,
- weighting means receiving the outputs of said Fourier transform means and said recursive filter means and providing a weighted resultant signal to said inverse Fourier transform means, and
- means for substracting, the output of said inverse Fourier transform means from the output of said delay means.

* * * * *